United States Patent [19]

Matsumoto et al.

[11] Patent Number: 4,977,249
[45] Date of Patent: Dec. 11, 1990

[54] METAL OF HYDROXY-PHENYLAZE AND HYDROXY-NAPHTHYLAZO COMPOUNDS AS NEAR-RED ABSORBERS

[75] Inventors: Yuto Matsumoto; Hiroyoshi Yamaga; Noboru Akuzawa; Toshio Obara, all of Tokyo, Japan

[73] Assignee: Hodogaya Chemical Co., Ltd., Tokyo, Japan

[21] Appl. No.: 449,139

[22] Filed: Dec. 13, 1989

Related U.S. Application Data

[63] Continuation of Ser. No. 69,188, Jul. 2, 1987, abandoned.

[30] Foreign Application Priority Data

Jul. 13, 1986 [JP] Japan ................. 61-178795

[51] Int. Cl.$^5$ .............. C09B 45/01; C09B 45/14; D06P 1/10; G03G 9/08
[52] U.S. Cl. .................. 534/696; 534/716; 534/721
[58] Field of Search ............ 534/696, 716, 721

[56] References Cited

U.S. PATENT DOCUMENTS 4,553,976 11/1985 Raisin et al. ............ 534/713 X

FOREIGN PATENT DOCUMENTS

| 0241414 | 10/1987 | European Pat. Off. ............ 534/713 |
| 50-156541 | 12/1975 | Fed. Rep. of Germany ...... 534/713 |
| 56-120765 | 9/1981 | Japan ................. 534/713 |
| 59-29253 | 2/1984 | Japan ................. 534/713 |
| 495305 | 7/1974 | U.S.S.R. ................. 534/713 |
| 356716 | 9/1931 | United Kingdom ............... 534/713 |
| 592088 | 1/1934 | United Kingdom ............... 534/713 |

OTHER PUBLICATIONS

*Chem. Abst.*, vol. 102, 1985, p. 522 #103733 (v) and JP-A-59-11,385, Hadogaya, II.

*Primary Examiner*—Floyd D. Higel
*Attorney, Agent, or Firm*—Oblon, Spivak, McClelland, Maier & Neustadt

[57] ABSTRACT

A metal complex compound having the formula:

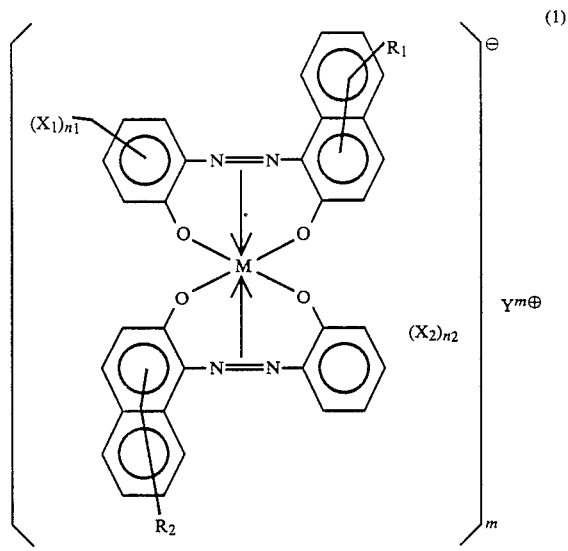

(1)

wherein each of $X_1$ and $X_2$ which may be the same or different, is a nitro group, a halogen atom, a phenylazo group (inclusive of a substituted phenylazo group) or a naphthylazo group (inclusive of a substituted naphthylazo group), each of $n_1$ and $n_2$ which may be the same or different, is an integer of from 1 to 3, each of $R_1$ and $R_2$ which may be the same or different, is an amino group, a monoalkylamino group, a dialkylamino group, an acetylamino group and a benzoylamino group (inclusive of a substituted benzoylamino group), M is a chromium atom, an iron atom, a cobalt atom, m is an integer of at least 2, and $Y^{m\oplus}$ is a bivalent or higher polyvalent metal ion. The metal complexes are useful as near infrared absorbers.

2 Claims, No Drawings

METAL OF HYDROXY-PHENYLAZE AND HYDROXY-NAPHTHYLAZO COMPOUNDS AS NEAR-RED ABSORBERS

This application is a continuation of application Ser. No. 069.188, filed on July 2, 1987, now abandoned.

The present invention relates to a metal complex compound useful as a near infrared absorber having an absorption band at a near infrared region.

In recent years, an attention has been drawn to utilization of near infrared rays in various fields. For example, in the field of optical information recording, there have been active developments of optical disks such as compact disks, video disks and optical document files wherein a laser beam is used as a light source. An infrared absorber is used as the main material or medium for the recording element in such optical disks. According to one embodiment of this principle, a laser beam absorption layer is formed on a substrate, and the absorption layer is irradiated with a laser beam corresponding to a light or sound, whereby the irradiated portion undergoes a physical or optical change, which is recorded (or written in) as a signal. By using a laser beam again, the change in the absorption layer (or the recording layer) is read out as a signal, and further converted and reproduced as a sound or light. Accordingly, the role of the near infrared absorber present in this recording layer is one of the most important factors for effectively absorbing the laser beam and for increasing the thermal efficiency.

Known infrared absorbers used in conventional recording layers, include an inorganic metal type absorber such as Te, In, Bi, $CS_2$-Te, Te-C and $TeO_x$, a metal complex disclosed in Japanese Examined Patent Publication No. 3452/1971, and a colorant absorber such as 3,3'-dimethyloxatricarbocyanin iodide. In the case of the inorganic metal absorber, the film forming to form a recording layer on the substrate, must be conducted by vacuum vapor deposition, which requires a special apparatus, and the operation efficiency is extremely low. Further, the problem of toxicity is also a serious stumbling block. In the case of the metal complex, the extinction coefficient is small, and it is necessary to use it in a large amount. Yet, its solubility in a solvent or its compatibility with a resin is poor, and it is inferior also in the storage stability.

On the other hand, the colorant absorber is extremely weak against light or heat, and there is no practically useful product, although it has a large extinction coefficient.

Thus, among the conventional known compounds, no near infrared absorber has been found which fully satisfies various properties practically required for a recording material.

The properties required for a near infrared absorber as a material for the recording layer include the reproducibility of a thin film having a uniform composition, the stability in the light and heat resistance for a long period of time with high decomposition resistance, the high sensitivity, and the uniformity in the shape of the recording pits.

The present inventors studied metal complex compounds as colorants for many years, and found that the compounds disclosed in Japanese Examined Patent Publication No. 42269/1985 were useful as near infrared absorbers. From a further continuous study of peripheral compounds, the present inventors have now found new compounds which have an absorption wavelength region substantially wider than the above compounds and which are practically extremely advantageous for use as near infrared absorbers.

Namely, present invention provides a metal complex compound having the formula:

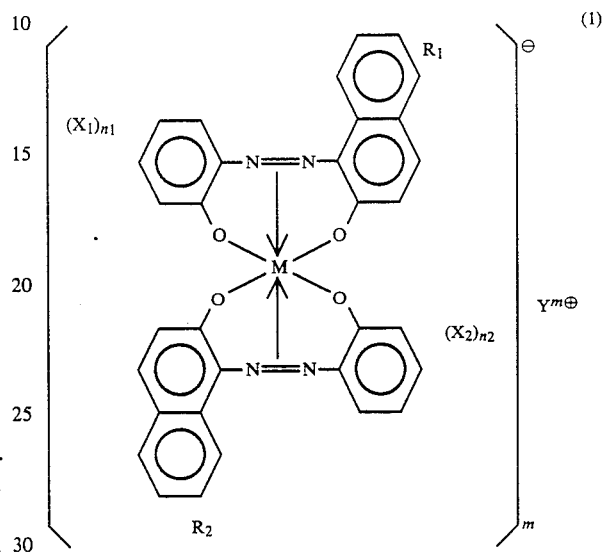

wherein each of $X_1$ and $X_2$ which may be the same or different, is a nitro group, a halogen atom, a phenylazo group (inclusive of a substituted phenylazo group) or a naphthylazo group (inclusive of a substituted naphthylazo group), each of $n_1$ and $n_2$ which may be the same or different, is an integer of from 1 to 3, each of $R_1$ and $R_2$ which may be the same or different, is an amino group, a monoalkylamino group, a dialkylamino group, an acetylamino group and a benzoylamino group (inclusive of a substituted benzoylamino group), M is a chromium atom, an iron atom, a cobalt atom, m is an integer of at least 2, and $Y^{m\oplus}$ is a bivalent or higher polyvalent metal ion.

The present invention also provides use of the compound of the formula (1) as a near infrared absorber.

Now, the present invention will be described in detail with reference to the preferred embodiments.

The metal complex compound of the formula (1) can be prepared in accordance with the following process.

Diazo components of the formulas:

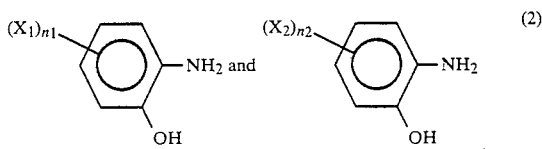

wherein $X_1$, $X_2$, $n_1$ and $n_2$ are as defined above, are diazotized by a usual method, and the obtained diazo compounds are coupled with coupling components of the formulas:

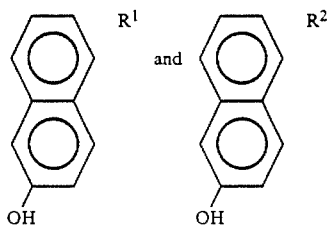

wherein $R_1$ and $R_2$ are as defined above, by a usual method to obtain monoazo compounds having the formulas:

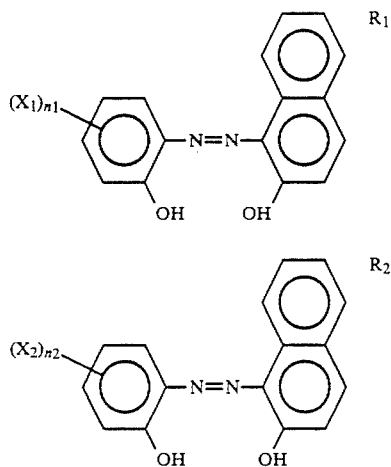

wherein $X_1$, $X_2$, $n_1$ and $n_2$, $R_1$ and $R_2$ are as defined above. Then, these monoazo compounds are treated with a corresponding metal-imparting agent in water or in an organic solvent, and further subjected to counter ion exchange with a polyvalent metal salt corresponding to $Y^{m\oplus}$, whereby the desired product can be obtained in good yield.

The diazo components of the formula (2) to be used in the present invention, include, for example, 5-nitro-2-aminophenol, 4,6-dinitro-2-aminophenol, 4-chloro-5-nitro-2-aminophenol, 3,4,5-trichloro-2-aminophenol, 4-phenylazo-2-aminophenol, and 4-naphthylazo-2-aminophenol.

The coupling components of the formula (3), include for example, 8-amino-2-naphthol, 8-benzoylamino-2-naphthol, 5-amino-2-naphthol, 5-dimethylamino-2-naphthol, 8-n-butylamino-2-naphthol, 8-ethylamino-2-naphthol, 4-amino-2-naphthol and 4-n-butylamino-2-naphthol.

The polyvalent metal ion of the formula $Y^{m\oplus}$ includes $Ca^{2+}$, $Mg^{2+}$, $Ba^{2+}$, $Sr^{2+}$, $Zn^{2+}$, $Cu^{2+}$, $Co^{2+}$, $Ti^{2+}$, $Fe^{2+}$, $Cr^{3+}$, and $Al^{3+}$.

Now, the excellent near infrared absorption properties of the metal complex compound of the formula (1) will be described.

Namely, the metal complex compound of the formula (1) has an absorption band in a wavelength region of from 400 to 1,000 nm. Its molecular extinction coefficient is at least 50,000 in a wavelength region of from 750 to 850 nm, which is the wavelength region of semiconductor laser beams which are practically most commonly employed at present. It has excellent light and heat resistance and shows good solubility in various solvents and excellent compatibility with various resins. Thus, it has been found most suitable as a material for a recording layer for optical recording.

Further, the absorption wavelength region of the metal complex compound of the formula (1) extends to a visible light region. It is therefore one of the features of the present invention that by utilizing this characteristic nature, the compound of the present invention can be used as a filter to screen or shield lights having wavelengths ranging from the visible region to the near infrared region. For example, it is effectively used as a light filter to prevent an erroneous operation of a remote control device for an electrical product, particularly for a television, radio or stereo, of a speed or distance measuring device for a camara or projector, or of a receptor for a game machine or for an automatic door, particularly due to a light beam in a visible region where the change in the quantity of the light beam is substantial.

Now, the present invention will be described in further detail with reference to Examples. However, it should be understood that the present invention is by no means restricted by these specific Examples. In these Examples, "parts" means "parts by weight".

EXAMPLE 1

15.4 Parts of 5-nitro-2-aminophenol was diazotized with 25 parts of concentrated hydrochloric acid and 6.9 parts of sodium nitrite at a temperature of from 0 to 5° C. by a conventional method, and then coupled with 15.9 parts of 8-amino-2-naphthol under an alkaline condition at a temperature of from 0° to 5° C. to obtain 32 parts of a monoazo compound having the formula:

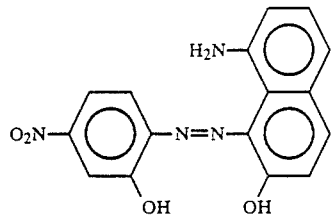

This monoazo compound was dispersed in a water solvent, and 13.8 parts of salicylic acid, 5.4 parts of ammonium chloride and 17.3 parts of chromium acetate were added thereto. After the temperature rise, 5 parts of sodium hydroxide was added thereto, and the mixture was stirred at 90° C. for about 3 hours until the chromium complexing completed. After the completion of the complexing, the colorant formed was collected by filtration, and dispersed again in a water solvent. Then, 2 parts of calcium hydroxide and 40 parts of calcium chloride were added thereto, and the mixture was stirred under a nitrogen stream at 95° C. for 3 hours for counter ion exchange treatment. The mixture was left to cool, and then subjected to filtration, washing with water and drying, to obtain 41 parts of a chromiun complex compound having the following formula in good yield as a black powder:

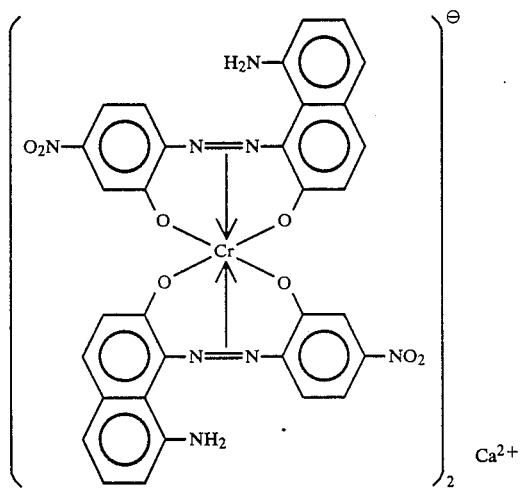

Melting point: at least 300° C. (as measured by a capillary method)

Elemental analysis: (as $C_{64}H_{40}N_{16}Cr_2Ca$)

|  | C | H | N | Cr | Ca |
| --- | --- | --- | --- | --- | --- |
| Found (%): | 54.01 | 2.43 | 14.53 | 7.21 | 2.60 |
| Calculated (%): | 53.63 | 2.81 | 15.64 | 7.26 | 2.80 |

This compound had a maximum absorption wavelength of 730 nm and a molecular extinction coefficient of $5.2 \times 10^4$, as measured in dimethylformamide.

Then, a 1% methyl ethyl ketone solution of this chromium complex compound was spin-coated at 1800 rpm on a polymethyl methacrylate plate to form a colorant film having a thickness of 0.5 μm, and the absorption spectrum was measured. As compared with the known compound disclosed in Example 1 of Japanese Examined Patent Publication No. 42269/1985 (wherein an octoxypropylammonium ion is used as the counter ion), the compound of the present invention had the same maximum absorption wavelength in the dimethylformamide solution. However, the maximum absorption wavelength of the colorant film on the substrate was 720 nm in the case of the compound of the present invention i.e. shifted towards the long wavelength side as compared with 700 nm in the case of the known compound, and the absorption intensity at 830 nm (i.e. the center wavelength of semiconductor laser beams) was substantially improved.

The disk having the above colorant film as the recording layer, was irradiated with a GaAlAs system semiconductor laser beam having a ceter wavelength of 830 nm, whereupon the formation of pits at the irradiated portion was confirmed by the examination by means of a scanning electron microscope. The information recorded on this disk could be read out with a low output (i.e. 1/5 to 1/10 of the output for recording) of the same wavelength as used for recording. The compound of the present invention was compared with the above-mentioned known compound with respect to the S/N ratio relating to the read-out and the recording sensitivity. The results are shown in Table 1.

|  | S/N ratio (dB) | Recording sensitivity (mJ/cm$^2$) |
| --- | --- | --- |
| Compound disclosed in Example 1 of Japanese Examined Patent Publication No. 42269/1985 (Comparative Example): | 55 | 0.8 |
| Compound of the present invention: | 80 | 0.5 |

This disk was left to stand at 50° C. in an atmosphere with a humidity of 70% for 6 months, whereby the recording sensitivity and the recording signals were stable without any substantial change.

EXAMPLE 2

By using 8-N-(n-)butylamino-2-naphthol as the coupling component, chromium complexing was conducted in accordance with Example 1, and 40 parts of the colorant thus formed, was collected by filtration, and dispersed again in a water solvent. Then, 40 parts of barium hydroxide was added thereto, and the mixture was stirred in a nitrogen stream at 95° C. for 3 hours for counter ion exchange treatment. The reaction mixture was left to cool, and then filtered, washed with water and dried to obtain 39 parts of a chromium complex compound of the following formula in the four of powder having a special color in good yield.

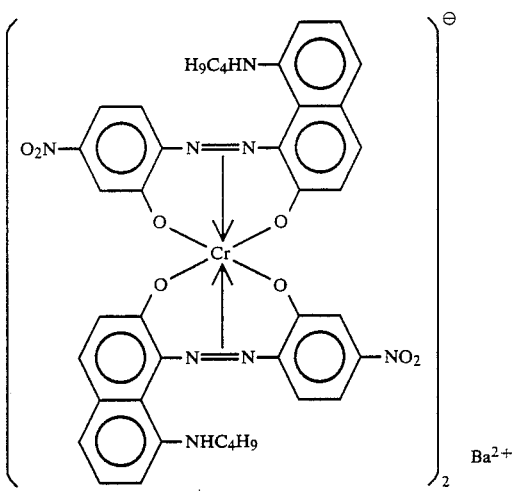

Melting point: at least 300° C. (as measured by a capillary method)

Elemental analysis: (as $C_{80}H_{72}N_{16}O_{16}Cr_2Ba$)

|  | C | H | N | Cr | Ca |
| --- | --- | --- | --- | --- | --- |
| Found (%): | 55.18 | 3.99 | 12.02 | 5.89 | 7.14 |
| Calculated (%): | 54.75 | 4.14 | 12.77 | 5.93 | 7.83 |

The maximum absorption wavelength of this compound in dimethylformamide was 760 nm, and the molecular extinction coefficient was $5.1 \times 10^4$.

The above compound and the compound of Example 7 of Japanese Examined Patent Publication No. 42269/1985 (as the counter ion, octoxypropylammonium ion was used instead of barium ion) were compared in the same manner as in Example 1, whereby the results were as shown in Table 2. It it evident that the compound of the present invention is superior.

TABLE 2

|  | S/N ratio (dB) | Recording sensitivity (mJ/cm$^2$) |
|---|---|---|
| Compound disclosed in Example 1 of Japanese Examined Patent Publication No. 42269/1985 (Comparative Example): | 80 | 0.9 |
| Compound of the present invention: | 110 | 0.5 |

EXAMPLE 3

By using 8-N-(n-)butylamino-2-naphthol as the coupling component, 33 parts of a monoazo compound was obtained in accordance with Example 1. This monoazo compound was dispersed in a water solvent, and 9.4 parts of salicylic acid, 27 parts of ammonium chloride and 7.4 parts of ferric chloride were added thereto. After the temperature rise, 10 parts of sodium hydroxide was added thereto, and the mixture was stirred at 90° C. for about 2 hours until the iron complexing completed. After the completion of the complexing, the colorant thus formed, was collected by filtration, and dispersed again in a water solvent. Then, 60 parts of chromium (III) chloride was added thereto, and the mixture was stirred at 95° C. for 4 hours for counter ion exchange treatment. The mixture was left to cool, and then subjected to filtration, washing with water and drying to obtain 39 parts of an iron complex compound having the following formula in good yield.

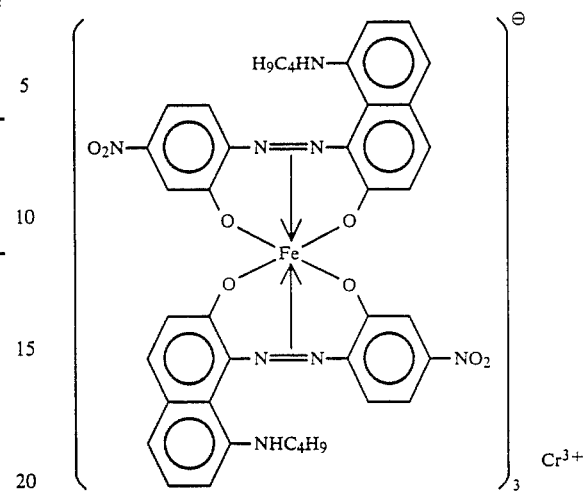

Melting point: at least 300° C. (as measured by a capillary method)

Elemental analysis: (as $C_{120}H_{108}N_{24}O_{24}Fe_3Cr$)

|  | C | H | N | Cr | Ca |
|---|---|---|---|---|---|
| Found (%): | 59.02 | 4.94 | 12.83 | 7.41 | 1.99 |
| Calculated (%): | 57.89 | 4.37 | 13.50 | 6.73 | 2.09 |

This compound had the maximum absorption wavelength of 720 nm and a molecular extinction coefficient of $5.4\times10^4$ as measured in dimethylformamide.

This compound was compared with the same compound wherein the counter ion was changed to an octoxymethylammonium ion instead of chromium, in the same manner as in Example 1. The results are shown in Table 3. It is evident that the compound of the present invention is superior.

TABLE 3

|  | S/N ratio (dB) | Recording sensitivity (mJ/cm$^2$) |
|---|---|---|
| Above identified comparative compound (Comparative Example): | 125 | 0.3 |
| Above identified compound of the present invention: | 135 | 0.2 |

EXAMPLES 4 to 15

The same operation as in Example 1 was conducted by using the metal complex compounds, the solvents, the binders and the substrates for coating as identified in the following Table. The results are also shown in the Table.

| Example | Metal complex compound | Solvent | Binder | Substrate for coating | S/N ratio (dB) | Recording sensitivity (mJ/cm$^2$) |
|---|---|---|---|---|---|---|
| 4 | 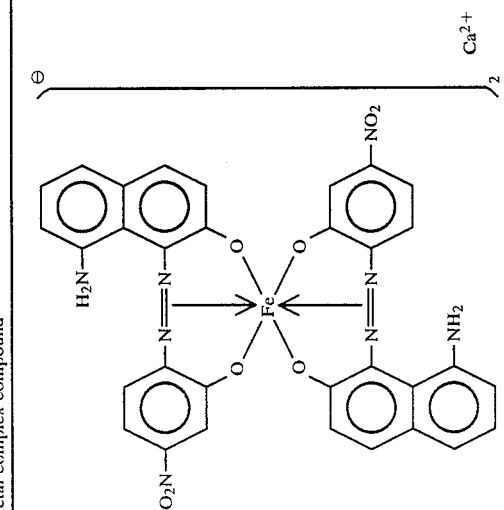 | Chloroform | — | Acrylic resin | 75 | 0.3 |
| 5 | 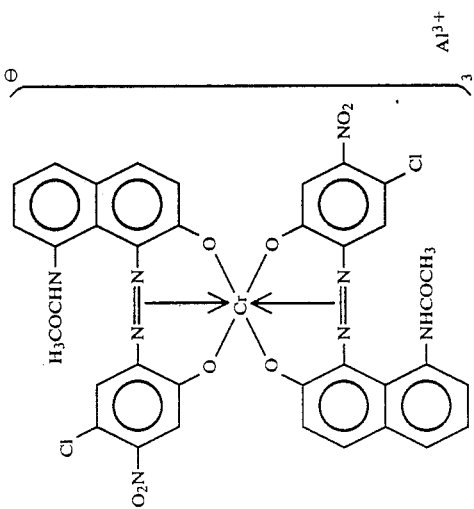 | Acetone | — | Polycarbonate resin | 79 | 0.5 |

-continued
| Example | Metal complex compound | Solvent | Binder | Substrate for coating | S/N ratio (dB) | Recording sensitivity (mJ/cm²) |
|---|---|---|---|---|---|---|
| 6 | 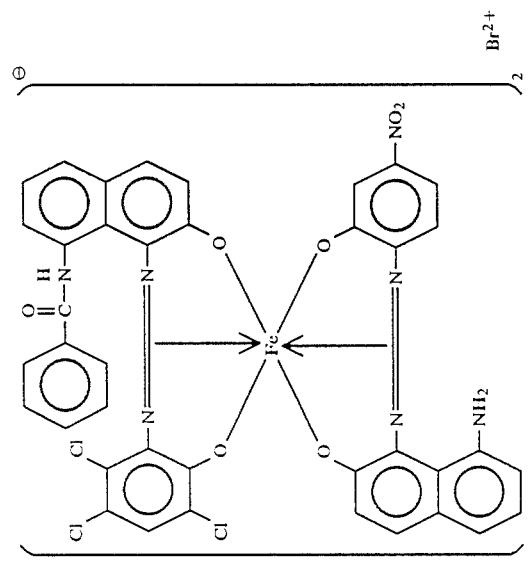 | Acetone | Nitrocellulose | Glass sheet | 65 | 0.3 |
| 7 | 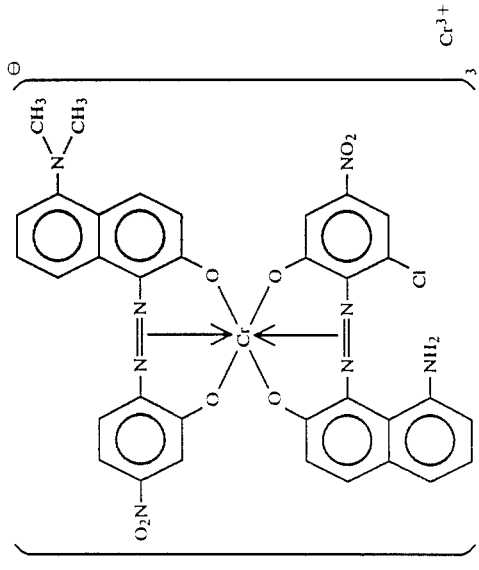 | Methyl ethyl ketone | — | Acrylic resin | 70 | 0.5 |

-continued
| Example | Metal complex compound | Solvent | Binder | Substrate for coating | S/N ratio (dB) | Recording sensitivity (mJ/cm$^2$) |
|---|---|---|---|---|---|---|
| 8 | 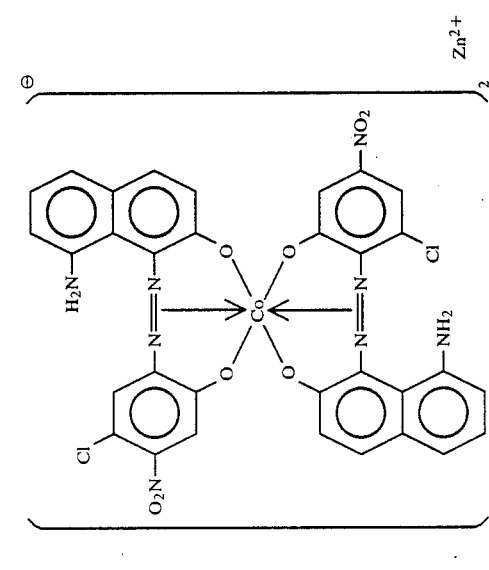 | Dichloroethane | — | Acrylic resin | 75 | 0.5 |
| 9 | 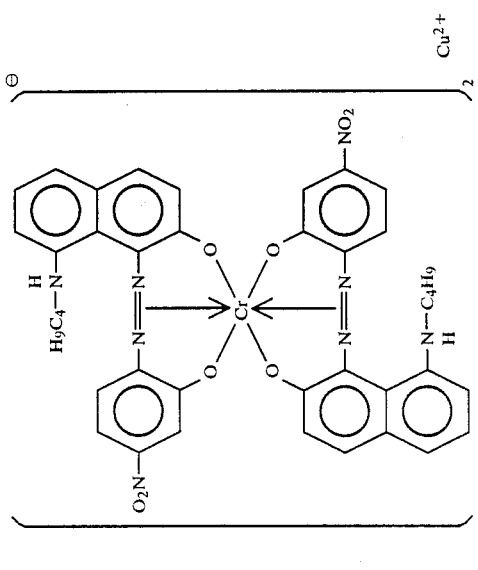 | Acetone | — | Epoxy resin | 85 | 0.4 |

-continued
| Example | Metal complex compound | Solvent | Binder | Substrate for coating | S/N ratio (dB) | Recording sensitivity (mJ/cm²) |
|---|---|---|---|---|---|---|
| 10 | 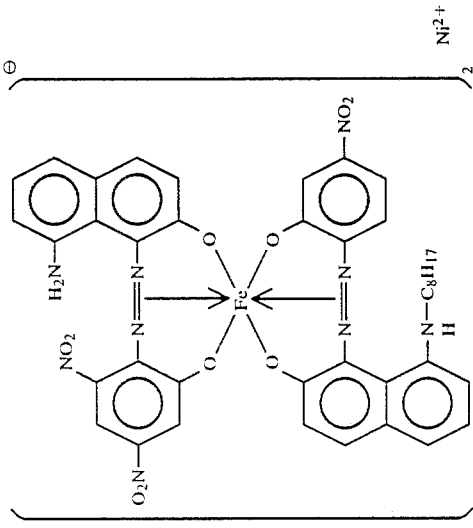 | Methyl ethyl ketone | — | Polycarbonate resin | 130 | 0.1 |
| 11 | 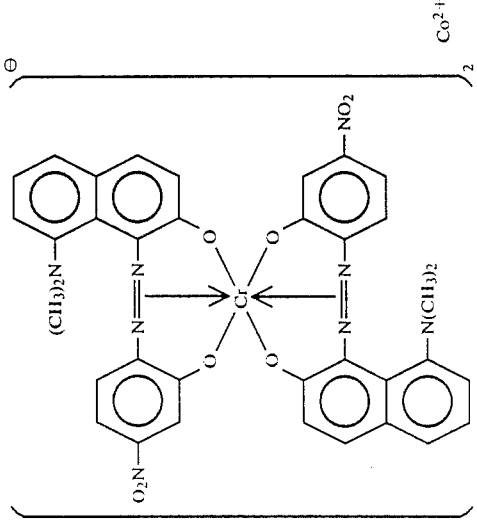 | Chloroform | Nitrocellulose | Glass sheet | 60 | 0.6 |

-continued
| Example | Metal complex compound | Solvent | Binder | Substrate for coating | S/N ratio (dB) | Recording sensitivity (mJ/cm$^2$) |
|---|---|---|---|---|---|---|
| 12 | 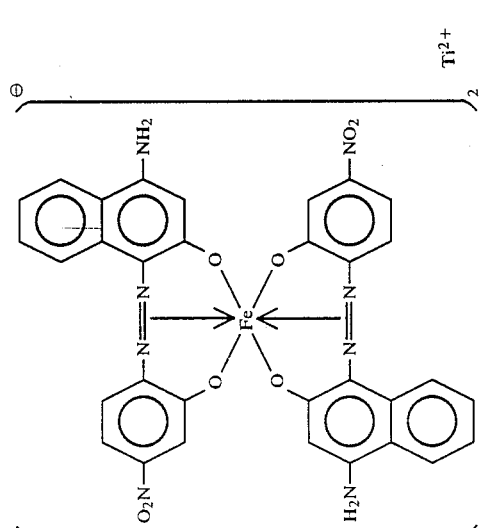 | Methyl ethyl ketone | — | Epoxy resin | 80 | 0.4 |
| 13 | 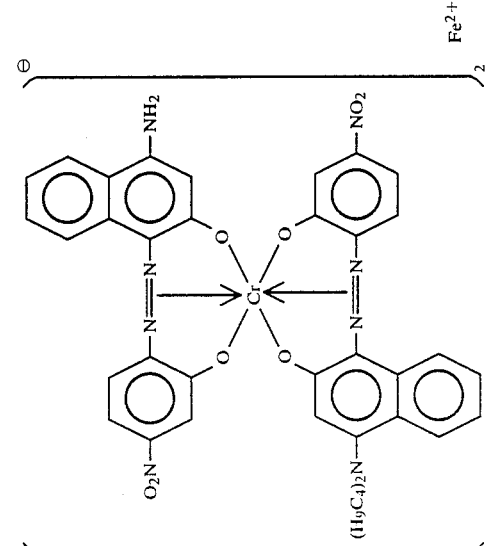 | Acetone | — | Acrylic resin | 80 | 0.5 |

-continued

| Example | Metal complex compound | Solvent | Binder | Substrate for coating | S/N ratio (dB) | Recording sensitivity (mJ/cm²) |
|---|---|---|---|---|---|---|
| 14 | (Cr complex) Mg²⁺ | Chloroform | — | Acrylic resin | 80 | 0.4 |
| 15 | (Fe complex) Ba²⁺ | Dichloroethane | — | Acrylic resin | 100 | 0.3 |

EXAMPLE 16

One part of the following metal complex compound prepared in accordance with Example 1:

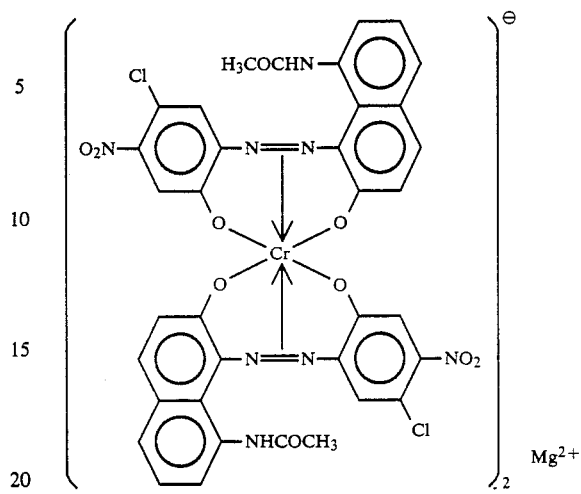

was added to 150 parts of Epikote 828 (tradename, manufactured by Shell Chemical), and the mixture was kneaded. Then, 15 parts of Epicure K61B (curing agent) was added thereto, and the mixture was mixed at a temperature of from 20° to 25° C., and then injected into a mold in which a receptor element of a light emission diode was placed, and then cured at 80° C. for 2 hours, to obtain a molded product of a metal complex compound-containing epoxy resin with a receptor element embedded therein. The receptor element thus obtained was free from erroneous operation, since it receives only a selected light passed through the above-mentioned metal complex compound-containing epoxy resin layer.

Further, a similar molded filter product was obtained by using an AS resin instead of the epoxy resin in this Example.

EXAMPLES 17 to 25

Molded products with receptor elements embedded therein were prepared in the same manner as in Example 16 by using the metal complex compounds and the blending resins as identified in the following Table. The light transmittance (%) of each molded product is also shown in the Table.

| Example | Metal complex compound | Resin | Blending method | Light transmittance (%) of the molded product | | |
|---|---|---|---|---|---|---|
| | | | | 300~800 nm | 800~900 nm | 900~1,100 nm |
| 17 | ![structure: Cr complex with two ligands (one 1-amino-naphthyl azo phenolate with Cl and NO2; the other naphthyl azo with NHCOCH3 substituent and Cl, NO2 on phenol), anion charge, Cu²⁺ counterion, ratio 2] | Methyl methacrylate | Kneading | 0 | 0~90 | 90~99 |

-continued
| Example | Metal complex compound | Resin | Blending method | Light transmittance (%) of the molded product | | |
|---|---|---|---|---|---|---|
| | | | | 300~800 nm | 800~900 nm | 900~1,100 nm |
| 18 | 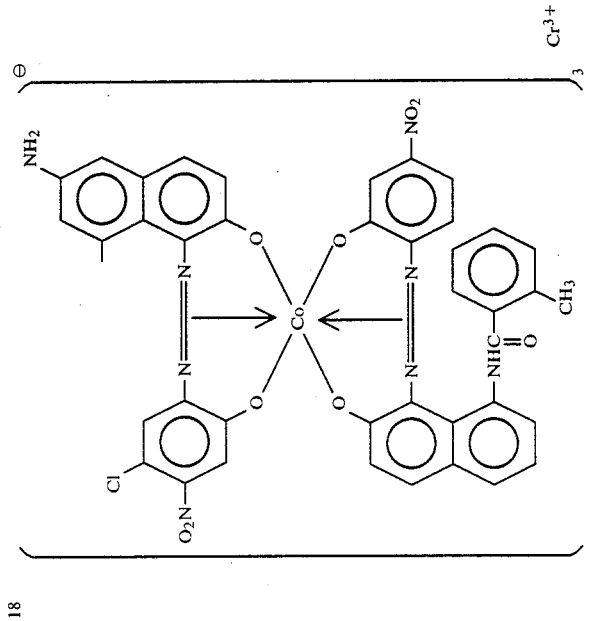 | Polyester | Kneading | 0 | 0~92 | 92~98 |

-continued

| Example | Metal complex compound | Resin | Blending method | Light transmittance (%) of the molded product | | |
|---|---|---|---|---|---|---|
| | | | | 300~800 nm | 800~900 nm | 900~1,100 nm |
| 19 | [complex structure with Fe, azo ligands bearing H₂N, NHCOCH₃, O₂N substituents] Ba²⁺ | Polyester | Kneading | 0 | 0~85 | 85~95 |
| 20 | [complex structure with Cr, azo ligands bearing H₉C₄N, NHC₄H₉, NO₂, O₂N substituents] Mg²⁺ | Polyester | Kneading | 0 | 0~95 | 95~99 |

-continued

| Example | Metal complex compound | Resin | Blending method | Light transmittance (%) of the molded product | | |
|---|---|---|---|---|---|---|
| | | | | 300~800 nm | 800~900 nm | 900~1,100 nm |
| 21 | [Fe complex with naphthyl-azo-nitrophenol and aminonaphthyl-azo-dinitrophenol ligands]$_2$ Sr$^{2+}$ | Polyester | Kneading | 0 | 0~92 | 92~98 |
| 22 | [Co complex with octylamino-naphthyl-azo-nitrophenol ligands]$_2$ Zn$^{2+}$ | Polyester | Kneading | 0 | 0~95 | 95~97 |

-continued

| Example | Metal complex compound | Resin | Blending method | Light transmittance (%) of the molded product | | |
|---|---|---|---|---|---|---|
| | | | | 300~800 nm | 800~900 nm | 900~1,100 nm |
| 23 | [structure with Ni$^{2+}$, NH$_2$, NO$_2$, NHC$_2$H$_5$, O$_2$N groups] | Polyester | Kneading | 0 | 0~96 | 96~98 |
| 24 | [structure with Co$^{2+}$, N(C$_3$H$_7$)$_2$, NO$_2$, NC$_4$H$_9$H, O$_2$N groups, Fe center] | Polyester | Kneading | 0 | 0~95 | 95~99 |

-continued
| Example | Metal complex compound | Resin | Blending method | Light transmittance (%) of the molded product 300~800 nm | 800~900 nm | 900~1,100 nm |
|---|---|---|---|---|---|---|
| 25 | 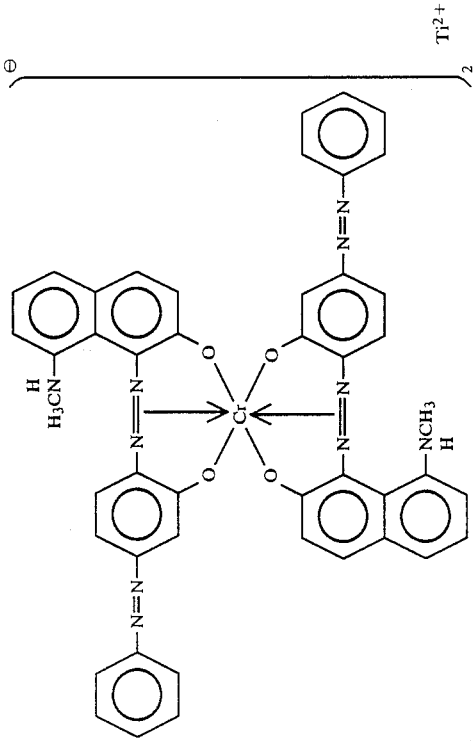 | Polyester | Kneading | 0 | 0~92 | 92~98 |

We claim:
1. A metal complex compound having the formula:

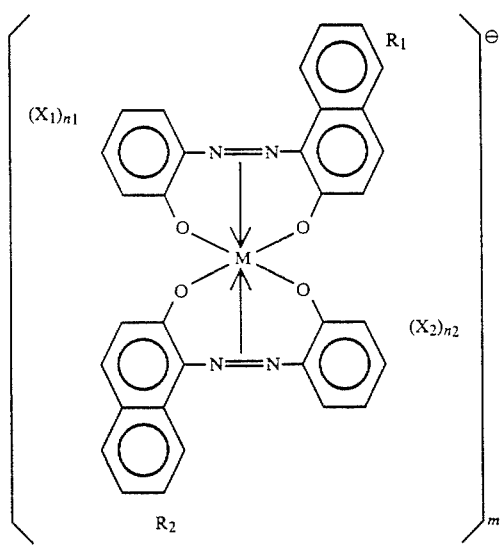

wherein each of $X_1$ and $X_2$, which are the same or different, is nitro, halogen, phenylazo or methoxy-substituted phenylazo, naphthylazo or methoxy-substituted naphthylazo; each of $n_1$ and $n_2$, which are the same or different, are each an integer of from 1 to 3, each of $R_1$ and $R_2$, which are the same or different, is amino, mono-lower alkylamino, di-lower alkylamino, acetylamino or benzoylamino; M is chromium, iron or cobalt; n is an integer of at least 2; and $Y^{m+}$ is a metal ion selected from the group consisting of $Ca^{+2}$ and $Al^{+3}$.

2. The compound according to claim 1, which is selected from the group consisting of:

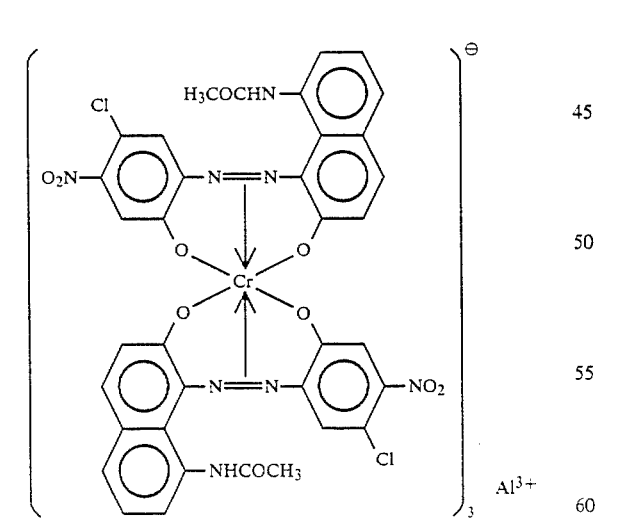

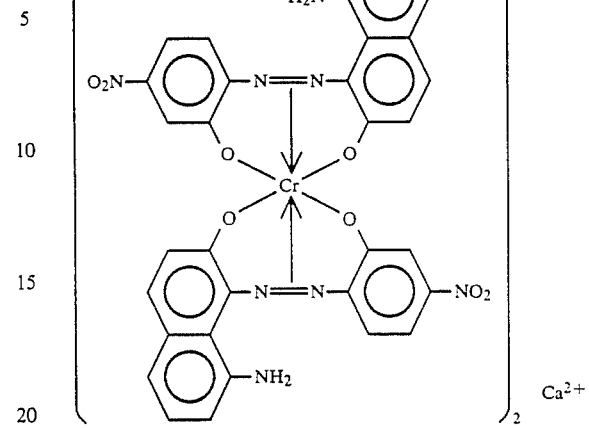

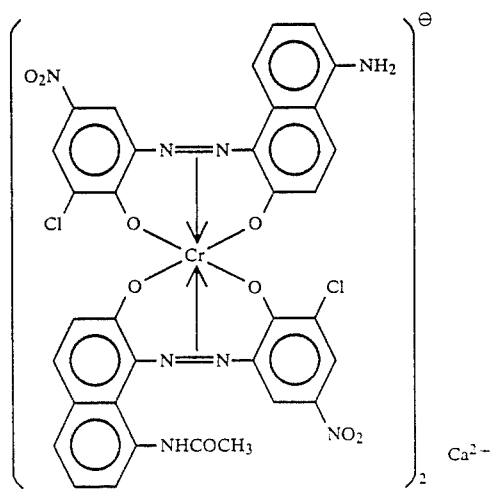

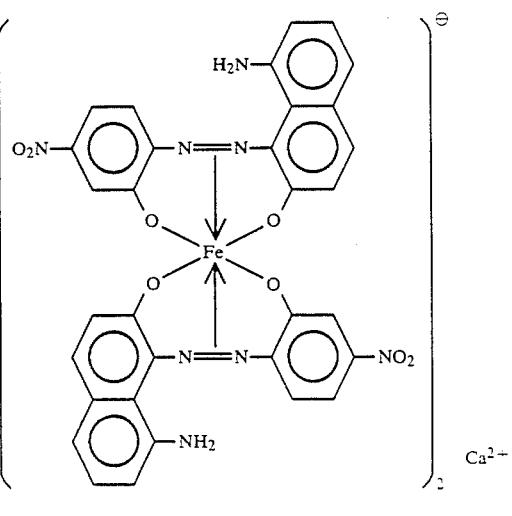

* * * * *

UNITED STATES PATENT AND TRADEMARK OFFICE
CERTIFICATE OF CORRECTION

PATENT NO. : 4,977,249
DATED : December 11, 1990
INVENTOR(S) : Yuto Matsumoto et al.

It is certified that error appears in the above-identified patent and that said Letters Patent is hereby corrected as shown below:

On the title page, item [54], and in column 1, line 2-4:

The title is incorrect, should be --METAL COMPLEXES OF HYDROXY-PHENYLAZO AND HYDROXY-NAPHTHYLAZO COMPOUNDS AS NEAR INFRA-RED ABSORBERS--.

Signed and Sealed this

Twenty-fifth Day of August, 1992

Attest:

DOUGLAS B. COMER

Attesting Officer

Acting Commissioner of Patents and Trademarks